United States Patent
Graubmann et al.

(10) Patent No.: US 9,283,828 B2
(45) Date of Patent: Mar. 15, 2016

(54) VEHICLE TEMPERATURE CONTROL DEVICE

(75) Inventors: Josef Graubmann, Olching (DE); Franco Moiso, München (DE)

(73) Assignee: WEBASTO SE, Stockdorf (DE)

( * ) Notice: Subject to any disclaimer, the term of this patent is extended or adjusted under 35 U.S.C. 154(b) by 32 days.

(21) Appl. No.: 14/127,340

(22) PCT Filed: Jun. 5, 2012

(86) PCT No.: PCT/DE2012/100170
§ 371 (c)(1),
(2), (4) Date: Dec. 18, 2013

(87) PCT Pub. No.: WO2013/004224
PCT Pub. Date: Jan. 10, 2013

(65) Prior Publication Data
US 2014/0121900 A1      May 1, 2014

(30) Foreign Application Priority Data
Jul. 4, 2011   (DE) .................. 10 2011 051 540

(51) Int. Cl.
*B60H 1/00*   (2006.01)
*B60H 1/22*   (2006.01)

(52) U.S. Cl.
CPC ........ *B60H 1/00764* (2013.01); *B60H 1/00778* (2013.01); *B60H 1/2206* (2013.01); *B60H 2001/2237* (2013.01)

(58) Field of Classification Search
None
See application file for complete search history.

(56) References Cited

U.S. PATENT DOCUMENTS

| | | | | |
|---|---|---|---|---|
| 5,791,407 | A * | 8/1998 | Hammons | 165/202 |
| 6,206,084 | B1 * | 3/2001 | Wieszt | 165/202 |
| 6,435,144 | B1 * | 8/2002 | Dicke et al. | 180/68.4 |
| 2010/0252644 | A1 * | 10/2010 | Elliott | B60H 1/00378 237/2 R |
| 2012/0143437 | A1 * | 6/2012 | Spohn et al. | 701/36 |
| 2013/0317728 | A1 * | 11/2013 | Hall et al. | 701/113 |

FOREIGN PATENT DOCUMENTS

| | | |
|---|---|---|
| DE | 19731071 A1 | 1/1999 |
| DE | 19906497 A1 | 8/2000 |
| DE | 10308254 A1 | 9/2004 |

(Continued)

OTHER PUBLICATIONS

Ralph Ostermeier, Robert Herbolzheimer; Translation of German Patent Application Publication 10 2007 004765, Aug. 7, 2008.*

(Continued)

*Primary Examiner* — Rami Khatib
*Assistant Examiner* — David Merlino
(74) *Attorney, Agent, or Firm* — Fitch, Even, Tabin & Flannery LLP

(57) ABSTRACT

A vehicle temperature control device for temperature control of a vehicle when the engine is stopped is provided, comprising: an engine-stop signaling device providing an engine-stop signal (MS) indicating an engine-stop; and an off-time temperature controller receiving a signal from the engine-stop signaling device and comprising at least an off-time temperature control automatic which can be switched on and off. The off-time temperature controller is adapted such that, when the off-time temperature control automatic has been switched on and when a heating demand is given, off-time temperature control is automatically started upon receipt of an engine-stop signal (MS).

12 Claims, 2 Drawing Sheets

(56) References Cited

FOREIGN PATENT DOCUMENTS

| | | |
|---|---|---|
| DE | 102004052354 A1 | 5/2006 |
| DE | 102007004765 A1 | 8/2008 |
| DE | 102009052604 A1 | 6/2010 |
| EP | 0891885 A2 | 1/1999 |
| WO | 2008092582 A1 | 8/2008 |

OTHER PUBLICATIONS

Bernd Kohlbecker, Hubert Krug, Werner Vogt, Andreas Zygan; Translation of German Patent Application Publication 10 2004 052354, May 4, 2006.*

International Search Report in PCT/EP2012/100170 issued Nov. 14, 2012.

* cited by examiner

VEHICLE TEMPERATURE CONTROL DEVICE

CROSS REFERENCE TO RELATED APPLICATIONS

This application is a U.S. National Phase application of International Application No. PCT/DE2012/100170, filed Jun. 5, 2012, which claims benefit of the priority date of German Application 10 2011 051 540.2, filed Jul. 4, 2011, which are hereby incorporated herein by reference in their entirety.

A vehicle temperature control device for temperature control of a vehicle when it is at rest and a method for temperature control of a vehicle which is at rest are provided.

Several devices for temperature control, i.e. heating or cooling, of vehicles are known. Such devices can be adapted for temperature control of a vehicle either only when the propulsion engine is running or to also perform temperature control of the vehicle when the propulsion engine of the vehicle is turned off. Typical devices for temperature control of a vehicle when the propulsion engine is running are in particular coolant-to-air heat exchangers in which waste heat of the propulsion engine is transferred to a medium to be heated, in particular to air, via coolant. For temperature control of a vehicle when the propulsion engine is turned off, also several devices are known, in particular fuel-operated heaters.

DE 10 2007 004 765 A1 describes a method for temperature control of a vehicle which is at rest. It is described to perform temperature control of the vehicle which is at rest by using residual heat of a heat source of the vehicle and by means of an active temperature control unit, such as a parking heater. Controlling by means of a single control element is described.

For several time now, more and more vehicles, in particular vehicles comprising a combustion engine, are used which have a thus-called start-stop automatic. In a start-stop automatic, the propulsion engine of the vehicle is automatically turned off under predetermined conditions when the driving power of the engine is not needed. When the driving power of the engine is needed again, the propulsion engine is automatically started again. Automatic starting and turning-off of a combustion engine in particular also takes place in thus-called hybrid vehicles which have a combustion engine and an electric motor and in which the combustion engine is additionally activated if needed.

In the area of commercial vehicles and construction machines, in many cases not only temperature control of an internal space is effected by means of the coolant circuit of the propulsion engine, but also temperature control of other components, in particular hydraulic liquids, is effected. In the case of cooling-down of these components, often a new warm-up period becomes necessary, which may reduce the productivity of the commercial vehicle or construction machine. In the case of running the propulsion engine of the vehicle only to maintain heating, on the one hand, high fuel costs arise in many cases and, on the other hand, in many cases charging of costs, determination of the vehicle value and/or maintenance activities are carried out depending on the operation hours of the propulsion engine, such that also due to this higher costs arise.

It is an object of the present invention to provide an improved vehicle temperature control device for temperature control of a vehicle when the engine is stopped and an improved method for temperature control of a vehicle when the engine is stopped.

The object is solved by a vehicle temperature control device for temperature control of a vehicle when the engine is stopped according to claim 1. Advantageous further developments are specified in the dependent claims.

The vehicle temperature control device comprises: an engine-stop signaling device providing an engine-stop signal indicating an engine-stop; and an off-time temperature controller (i.e., the engine off temperature controller) receiving a signal from the engine-stop signaling device and comprising at least one off-time temperature control automatic (i.e., automatic mode) which can be switched on and off. The off-time temperature controller is adapted such that, when the off-time temperature control automatic has been switched on and when a heating demand is given, off-time temperature control is automatically started upon receipt of an engine-stop signal.

The engine-stop signal is a signal providing information about the engine having gone into a turned-off state or now changing over into the turned-off state. The engine-stop signaling device can e.g. be a component of a given vehicle-side start-stop automatic which generates a corresponding engine-stop signal. It is however also possible to provide a separate engine-stop signaling device which can for example analyze the thus-called D+ signal (terminal 61) of the electric generator which indicates, if the engine is running, and the igniter signal in order to obtain the engine-stop signal. For example, in the latter case it can be provided that, when the igniter is turned off and the engine is turned off, no automatic off-time temperature control is effected; when the igniter is turned on and the engine is turned on, again no automatic off-time temperature control is effected (but for example supplementary heating for faster heating-up of e.g. a coolant circuit and of all integrated components); and, when the igniter is turned on and the engine is turned off, the automatic off-time temperature control is performed, if it has been activated.

The off-time temperature control automatic can be switched on and off, thus can be activated and deactivated by a user. The off-time temperature control automatic having been switched on means an activated off-time temperature control automatic. The presence of a heating demand can be determined in several ways. In particular the signal of a temperature sensor (or the signals of several temperature sensors) can be compared to one or more predetermined value(s). The predetermined values can e.g. be deposited in the off-time temperature controller or somewhere else or they can e.g. be entered by a user at a control element (e.g. an internal-space temperature target value, etc.).

Since the off-time temperature controller automatically (i.e. without further user input) starts off-time temperature control upon receipt of an engine-stop signal when the off-time temperature automatic has been switched on, the vehicle temperature control device thus enables comfortable operation e.g. also in the case of the vehicle propulsion engine, in particular a combustion engine, which is provided with a start-stop automatic. In particular in the case of construction machines or commercial vehicles, the vehicle temperature control device thus enables a reduction of the operation time of the propulsion engine in a comfortable manner, without resulting in comfort reduction with regard to internal-space heating or performance losses with regard to temperature control of other components. Compared to a case in which starting of e.g. a parking heater requires a separate user input, the described realization achieves a considerably more comfortable and for many applications better suited off-time temperature control. The off-time temperature controller can be provided e.g. locally in the control unit of a parking heater, in particular in the control unit of a heater device. It is however e.g. also possible to provide the off-time temperature controller in a central control unit of the vehicle.

According to one realization, at least one active parking heater is provided and the off-time temperature controller is adapted to also automatically start the parking heater during off-time temperature control, if necessary.

In the present context, active parking heater means a parking heater which provides for heating by converting another energy form into heat. Such an active parking heater can e.g. in particular be formed by a fuel-operated parking heater. The parking heater can e.g. be adapted to also heat a coolant in a coolant circuit. A parking heater means a heater which can provide heating power when the vehicle propulsion engine is turned off and, as the case may be, also additionally when the vehicle propulsion engine is running.

According to one development, a residual heat source is provided and the off-time temperature controller is adapted such that—when the off-time temperature control automatic has been switched on—heating with residual heat from the residual heat source is started upon receipt of the engine-stop signal if sufficient residual heat is available, and the parking heater is started if sufficient residual heat is not available. The residual heat source can e.g. in particular be formed by the warm coolant contained in a coolant circuit. Determination if sufficient residual heat is available or not can e.g. be carried out based on the signal of at least one temperature sensor which determines a temperature of the residual heat source. In particular, e.g. the temperature of the residual heat source can be compared to a predetermined target temperature of an internal space in order to determine if sufficient residual heat is available. As the case may be, further factors can also be considered for this determination. In the case of a coolant circuit with a coolant-to-air heat exchanger for heating air, the available residual heat can e.g. be used by operation of a pump for circulating the coolant. Due to the preferential use of potentially available residual heat, particularly efficient and resource-saving temperature management is provided, since the parking heater is only started if not enough residual heat is available. If the off-time temperature controller is arranged in a control unit of the parking heater, e.g. the control unit of the parking heater can be immediately started upon receipt of the engine-stop signal and it can firstly control the exploitation of residual heat before the active parking heater is started, which would involve energy conversion. If the off-time temperature controller is arranged in a central control unit of the vehicle (or at least not in the control unit of the parking heater), e.g. also the central control unit can firstly control exploitation of the residual heat and thereafter start a control unit of the parking heater when the residual heat is not sufficient any longer.

According to one development, off-time temperature controller comprises a residual-heat mode, which can be switched on and off, and is adapted to start only heating with residual heat without starting the parking heater upon receipt of an engine-stop signal when the residual-heat mode has been switched on. In this case, the user has the option to decide if also active heating with the active parking heater is to be used or not by switching this function on or off.

According to one development, the off-time temperature controller comprises a parking-heating mode, which can be switched on and off, and is adapted to automatically start the parking heater upon receipt of an engine-stop signal and when a heating demand is given, if the parking-heating mode has been switched on. In this case, the user can decide if immediately—without intermediate use of residual heat— the active parking heater shall be started in the case of an engine stop. This can be particularly useful e.g. in the case of construction machines or commercial vehicles, if cooling-down of components to be heated shall be prevented in any case.

According to one development, the off-time temperature controller is formed in a control unit of a parking heater device. According to another development, the off-time temperature controller is formed in a central control unit of a vehicle.

According to one development, the off-time temperature controller determines the presence of a heating demand based on the signal of at least one internal-space temperature sensor which detects the internal-space temperature of a vehicle. In this case, particularly easy determination of the heating demand is enabled. For example, the detected internal-space temperature can be compared to a fixedly predetermined temperature target value or to a temperature target value input by a user at an input device.

Particularly preferred is a use of the specified vehicle temperature control device in a construction vehicle or commercial vehicle.

The object is also achieved by a method for temperature control of a vehicle during engine-stop by means of an off-time temperature control automatic which can be switched on and off according to claim 8. Advantageous further developments are specified in the dependent claims.

When the off-time temperature control automatic has been switched on, when a temperature control demand is given, off-time temperature control of a vehicle internal space is automatically effected, during which also a parking heater is started if necessary, in response to a stop of the vehicle-engine. The method achieves the advantages described above with reference to the vehicle temperature control device.

According to one development,—when the off-time temperature control automatic has been switched on—if a heating demand is given and sufficient residual heat is present in a residual-heat source, heating using residual heat from the residual-heat source is effected, and if a heating demand is given and the residual heat is not sufficient, a parking heater is started. In this case, on the one hand, potentially available residual heat is efficiently used and, on the other hand, also reliable heating is conducted if the residual heat is not sufficient.

Further advantages and further developments will become apparent from the following description of embodiments with reference to the enclosed drawings.

EMBODIMENT

A vehicle temperature control device 1 for temperature control of a vehicle during engine-stop according to an embodiment will be described in the following.

Figure 1:
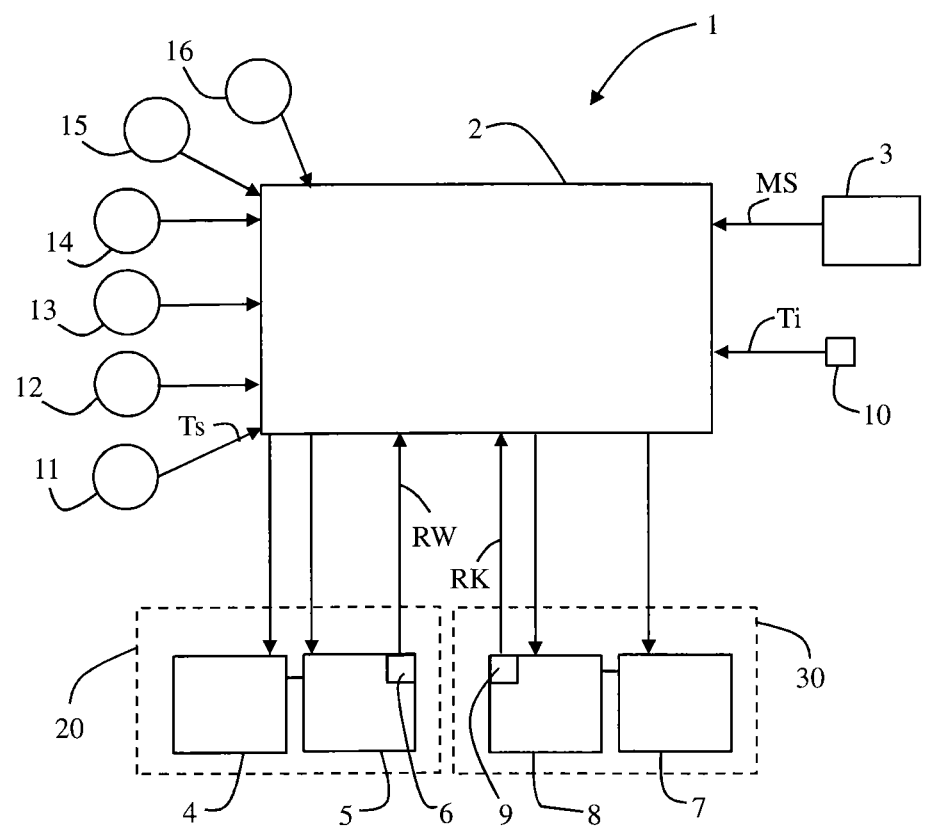
FIG. 1 shows a vehicle temperature control device for temperature control of a vehicle during engine-stop according to a first embodiment.

FIG. 1 is a schematic representation of the vehicle temperature control device 1 according to the embodiment. In the embodiment, the vehicle temperature control device 1 is specifically adapted for a construction vehicle or commercial vehicle, such as an excavator/digger, a fork-lift or something the like.

The vehicle temperature control device 1 comprises an off-time temperature controller 2 which is adapted to control different components which are provided for temperature control of the motor vehicle when the engine is stopped. To this end, the off-time temperature controller 2 is connected to the different components of the motor vehicle.

An engine-stop signaling device 3 is provided which provides an engine-stop signal MS indicating a stopping of the engine, as schematically depicted by an arrow in FIG. 1. The engine-stop signaling device 3 can e.g. be formed by a component of the vehicle engine control which provides a signal that the propulsion engine of the vehicle was stopped or is about to be stopped. In a hybrid vehicle comprising a combustion engine and at least one electric motor, the engine-stop signaling device 3 can in particular be formed such that the engine-stop signal MS indicates an engine-stop of the combustion engine. It is however also possible to provide a separate engine-stop signaling device which e.g. analyses the thus-called D+ signal (terminal 61) of the electric generator, which indicates if the engine is running, and the igniter signal, in order to obtain the engine-stop signal.

Further, an active parking heater 4 is provided which in the present embodiment is formed by a fuel-operated vehicle heating device. In the embodiment, the active parking heater 4 is arranged to heat the coolant in a coolant circuit of the vehicle via a heat exchanger. Such vehicle heating devices are often called liquid-heating devices. A residual heat source 5 is provided which in the present embodiment is formed by the coolant in the coolant circuit of the vehicle that has been described above. The residual heat source 5 is provided with a temperature sensor 6 which provides to the off-time temperature controller 2 a signal RW giving information about the available residual heat in the residual heat source 5. The temperature sensor 6 can e.g. be formed by a part of the parking heater 4. The active parking heater 4 and the residual heat source 5 together form an off-time heating block 20, illustrated in dashed lines in FIG. 1.

Further, an active parking air-conditioning device 7 is provided which in the present embodiment can e.g. be formed by a per se known air-conditioning device having an evaporator, a condenser, an expansion valve and an electrically operated compressor. In the embodiment, the active air-conditioning device 7 is formed to provide cooling power by converting electric energy into mechanical energy. Although an air-conditioning device having an electrically operated compressor is described with regard to the embodiment as the active air-conditioning device 7, also other per se known air-conditioning devices are possible, which can e.g. be formed as absorption cooling device, as evaporator cooling device or in connection with cold storages. The parking air-conditioning device 7 can be formed to also provide cooling power during operation of the vehicle propulsion engine. Further, a residual cold source 8 is provided which in the described embodiment can e.g. be formed by the evaporator of the parking air-conditioning device 7, which is still cold after operation of the parking air-conditioning device 7. The residual cold source 8 is provided with a temperature sensor 9 which provides a signal RK for the off-time temperature controller 2. The active parking air-conditioning device 7 and the residual cold source 8 together form an off-time cooling block 30, which is illustrated in dashed lines in FIG. 1 and the function of which will not be described in detail in the following.

The off-time temperature controller 2 is connected to the active parking heater 4, the residual heat source 5, the active parking air-conditioning device 7 and the residual cold source 8 such that it can respectively control their operation. In the case, in which the residual heat source 5 is formed by the coolant in a coolant circuit, controlling operation of the residual heat source can e.g. comprise circulating the coolant through a coolant-to-air heat exchanger (for example by means of a coolant pump, as the case may be).

In the depicted embodiment, further an internal-space temperature sensor 10 detecting the temperature of the internal space of the vehicle is provided, which provides a signal Ti representing the temperature of the internal space to the off-time temperature controller 2. Although such an internal-space temperature sensor 10 is provided in the embodiment, this is not absolutely mandatory. A target temperature setting device 11 for inputting a desired internal-space temperature by a user is provided. The target temperature setting device 11 can e.g. be formed by a rotary knob, a slide control, or by another input device operable by a user.

In the depicted embodiment, further input devices are provided which are also connected to the off-time temperature controller 2 and which will be described in the following. Although plural separate switches will be described in the following, for example only one switch having plural switching steps may be provided instead or the functions can be apportioned to two or more switches in an appropriate manner. In the embodiment, a switch 12 for switching an off-time temperature automatic on and off is provided. Further, a switch 13 for switching a residual-heat mode on and off is provided. A further switch 14 is provided for switching a parking-heating mode on and off. The switches 12, 13, 14 are interconnected such that in any case only at maximum one of them can be in a switched-on state or activated state, respectively. Further, a switch 15 for switching a residual-cold mode on and off and a further switch 16 for switching a parking air-conditioning mode on and off are provided. The switches 12, 15 and 16 are interconnected such that in each case only at maximum one of them can be in a switched-on or activated state.

When the off-time temperature controller 2 receives an engine-stop signal MS from the engine-stop signaling device 3, then the way in which the off-time temperature controller 2 effects off-time temperature control depends on the kind of off-time temperature control that was selected by a user beforehand by operating the switches 12, 13, 14, 15, 16. It can e.g. be provided for that all or some of the functions which will be described in the following are only effected when an igniter signal indicating the vehicle being in operation is in a switched on state.

Upon receipt of the engine-stop signal MS, the off-time temperature controller 2 examines if there is a heating demand based on the signal Ti of the internal-space temperature sensor 10 and on the target temperature of the internal space Ts which has been set by means of the target temperature setting device 11. If the actual temperature is below the desired temperature, it is concluded that a heating demand exists. It can also be provided for that the absolute value of the difference between the actual temperature and the desired temperature has to exceed a certain threshold for heating demand to be found existent.

Thus, in a step S0 it is determined if there is a heating demand. For the case that a heating demand is found to be given, the resulting off-time temperature control is dependent on the question if the off-time temperature control automatic, the residual-heat mode, or the parking heating mode has been activated. In the following, the cases in which a heating demand exists will be described.

Figures 2, 3:
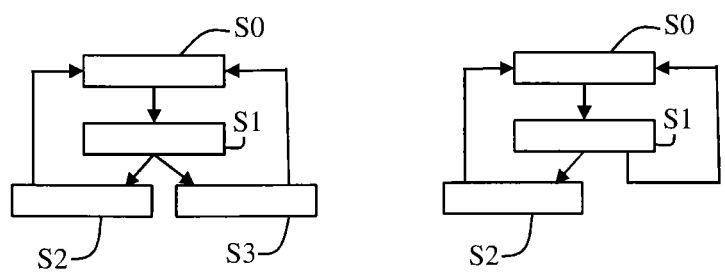
FIG. 2 is a schematic representation for illustrating operation with off-time temperature control automatic switched on and given heating demand.
FIG. 3 is a schematic representation for illustrating operation with activated residual-heat mode.

With reference to FIG. 2, in the following at first the case will be described in which a heating demand exists and the off-time temperature control automatic has been activated.

If there is a heating demand and the off-time temperature control automatic has been activated, in a step S1 the off-time temperature controller 2 determines based on the signal RW if there is sufficient residual heat in the residual heat storage 5.

If there is sufficient residual heat available, in a step S2 heating with residual heat is effected, which can e.g. be accomplished by operating a coolant circulation pump and a blower providing an airflow through a coolant-to-air heat exchanger. Subsequently, the off-time temperature controller 2 returns to step S0 in which it is checked if a heating demand exists.

If, in step S1, the off-time temperature controller 2 determines based on the signal RW that sufficient residual heat for heating is not available, then the active parking heater 4 is started in a step S3 such that active heating by means of the parking heater 4 is effected. Subsequently, the off-time temperature controller 2 returns to step S0 in which it is checked if a heating demand or cooling demand exists.

Starting with step S0, the described loops are then repeated again. Thus, when the off-time temperature control automatic has been activated and there is a heating demand, the off-time temperature controller 2 examines if sufficient residual heat is available and preferentially uses available residual heat for heating. In the case that sufficient residual heat is not available, the off-time temperature controller 2 automatically starts the active parking heater 4.

In the following, a case will be described with reference to FIG. 3 in which the off-time temperature automatic has been deactivated and the residual-heat mode has been activated. Also in this case, it is determined in a step S0 if there is a heating demand. If there is a heating demand, in a step S1 the off-time temperature controller 2 determines based on the signal RW if sufficient residual heat is available in the residual heat storage 5. If sufficient residual heat is available, heating with residual heat is effected in a step S2. Subsequently, the off-time temperature controller 2 returns to step S0 in which it is checked if there is a heating demand. If it is determined in step S1 that sufficient residual heat is not available, heating with residual heat is not activated and the off-time temperature control 2 directly returns to step S0.

Figure 4:
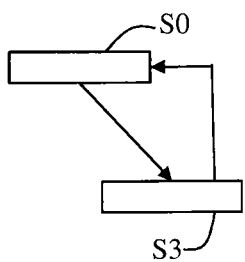
FIG. 4 is a schematic representation for illustrating operation with activated parking-heating mode.

Now, a case will be described with reference to FIG. 4 in which the off-time temperature control automatic has been deactivated and the parking-heating mode has been activated. In this case, it is determined in a step S0 if there is a heating demand. If there is a heating demand, the off-time temperature controller 2 in this case automatically starts the parking heater 4 in a step S3 and thereafter returns to step S0.

Cases have been described in which the presence of a heating demand was found in step S0. In the cases in which activation of the parking heater 4 takes place, activation can e.g. be effected directly by the off-time temperature controller such that also active controlling of the parking heater 4 is carried out. This possibility e.g. exists in particular if the off-time temperature controller 2 is formed in a control unit of a parking heater device. On the other hand, it is also possible that the off-time temperature controller 2 indeed directly controls the use of residual heat but—if needed—starts the parking heater 4 by sending a corresponding signal for starting to a separate control unit of a parking heater device. The latter case is particularly suitable if the off-time temperature controller 2 is formed in a central control unit of a vehicle. In these cases, the central control unit of the vehicle can be e.g. one which is only adapted for functions relating to temperature control or one which is also adapted for further functions in the vehicle.

In the described embodiment, the user can—by operating the switches 12 to 16—preset in which manner the off-time temperature controller 2 effects temperature control upon receipt of the engine-stop signal MS. In this way, the user can very purposefully activate and deactivate distinc functions and thus secure operation according to its needs. In the embodiment, operation of the switches, i.e. also activating of the automatic off-time temperature control, remains upheld until the user deactivates it again. In this way it is achieved that the activated off-time temperature control is e.g. still maintained after removal of the ignition key and e.g. parking of the vehicle. Thus, it is directly activated again during the next use of the vehicle such that automatic temperature control is again available when the engine is stopped but the ignition stays activated.

The off-time temperature control automatic can also be adapted such that also a supplementary heating function is included in which—if the off-time temperature control automatic has been activated—also the active parking heater 4 becomes activated in the case of an engine start and a heating demand to quicker heat up the engine and thus also to achieve a higher amount of available residual heat in a faster way.

Although a realization was described with reference to the embodiment in which both the off-time heating block 20 comprising the active parking heater 4 and the residual heat source 5 and the off-time cooling block 30 comprising the air-conditioning device 7 and the residual cold source 8 are provided, for example also realizations are possible in which only the off-time heating block 20 is provided.

In a very cost-efficient realization it is for example also possible not to provide for exploitation of a residual heat source but only to provide for automatic starting of an active parking heater 4 by the off-time temperature controller 2, if—with the off-time temperature control automatic which is adapted such that it can be switched on and off having been activated—an engine-stop signal MS is received and there is a heating demand.

The invention claimed is:

1. A construction vehicle having a temperature control device for heating a hydraulic liquid of the construction vehicle when an engine of the construction vehicle is stopped, comprising:
   the temperature control device having a vehicle engine-on and engine-stop signaling device;
   a temperature controller which is switchable on and off; and
   wherein the temperature controller is configured such that when the temperature controller has been switched on and upon receipt of a heating demand, the temperature controller automatically commands a construction vehicle heat source to heat the hydraulic liquid upon receipt of an engine-stop signal from the engine-on and engine-stop signaling device.

2. The construction vehicle having a temperature control device of claim 1, wherein the construction vehicle heat source is selectable from the group consisting of at least one active parking heater, residual heat of a construction vehicle coolant circuit, and combinations thereof.

3. The construction vehicle having a temperature control device of claim 1, wherein the construction vehicle heat source is at least one active parking heater, and wherein the temperature controller is configured to automatically start the at least one active parking heater at a predetermined target temperature.

4. The construction vehicle having a temperature control device of claim 1, wherein the construction vehicle heat source is residual heat of a construction vehicle coolant circuit.

5. The construction vehicle having a temperature control device of claim 1, wherein the construction vehicle is selected from the list consisting of forklifts, excavators, diggers and combinations thereof.

6. The construction vehicle having a temperature control device of claim 1,
   wherein the construction vehicle heat source is at least one active parking heater and residual heat of a construction vehicle coolant circuit; and
   wherein the temperature controller, once switched on and in response to a heating demand, is configured to first select the construction vehicle heat source of the residual heat of the construction vehicle coolant circuit if sufficient residual heat is available, and the parking heater as a secondary heat source if sufficient residual heat is not available.

7. The construction vehicle having a temperature control device of claim 1, wherein the temperature control device is integrated into a control unit of a parking heater.

8. The construction vehicle having a temperature control device of claim 1, wherein the temperature controller is integrated into a central control unit of the construction vehicle.

9. The construction vehicle having a temperature control device of claim 1, wherein the heating demand is determined by at least one temperature sensor of the construction vehicle component compared to at least one predetermined value.

10. The construction vehicle having a temperature control device of claim 9, wherein the at least one predetermined value resides in the temperature control device and is a predetermined target temperature.

11. The construction vehicle having a temperature control device of claim 1, wherein the temperature controller is configured to be switched off when the engine is on and when the engine is stopped.

12. A method for controlling temperature of a hydraulic liquid of a construction vehicle, comprising the steps of:
    switching on a temperature controller;
    sensing and signaling an engine stop to the temperature controller; and
    demanding a construction vehicle heat source, by the temperature controller, to heat the hydraulic liquid, if necessary, when the temperature controller is switched on and upon receiving an engine stop signal.

* * * * *